Feb. 2, 1960 G. E. FRANCK 2,923,323
TUBE PLUG
Filed Sept. 5, 1957
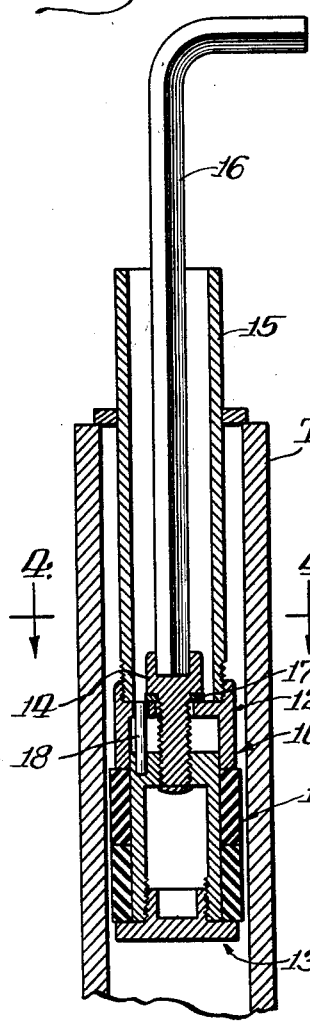
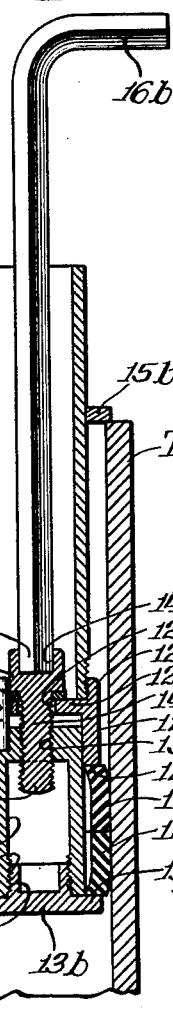
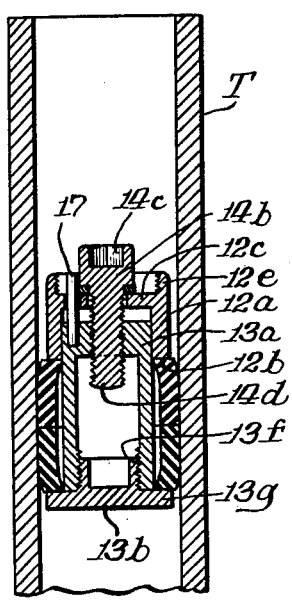
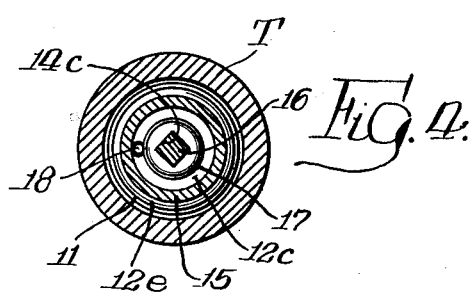
INVENTOR.
George E. Franck

United States Patent Office 2,923,323
Patented Feb. 2, 1960

2,923,323
TUBE PLUG

George E. Franck, Riverside, Ill., assignor to The Imperial Brass Manufacturing Company, a corporation of Illinois Application September 5, 1957, Serial No. 682,170

2 Claims. (Cl. 138—89)

This invention relates to a plug device and in particular to a plug device for sealingly closing a tube.

In the installation of fluid systems it is often desirable to test portions thereof to determine the satisfactoriness of the installed portion prior to the completion of the entire installation. To conduct such tests it is often necessary to plug or close temporarily one or more of the tubes thereof. A plug device suitable for such an operation should be readily installable, yet effect a positive sealing or plugging of the tube.

Alternatively, it is desirable at times to provide a means for closing a tube, which, while more or less permanently installed therein, is received fully within the tube.

The principal object of this invention is to provide a new and improved tube plug.

Another object of the invention is to provide such a plug having new and improved means for effecting forceful sealing thereof within the end of a tube.

A further object is to provide such a plug having a simple, economical construction, yet which is arranged to effect a positive plugging of the tube.

Other features and advantages of the invention will be apparent from the following description taken in connection with the accompanying drawings wherein:

Fig. 1 is a diametric longitudinal section of a plug means embodying the invention positioned for installation in the end of a tube;

Fig. 2 is a view similar to that of Fig. 1 but with the plug expanded into sealing engagement with the tube;

Fig. 3 is a view similar to that of Fig. 2 but with the installing means removed; and Fig. 4 is a transverse section taken approximately along the line 4—4 of Fig. 1.

In the exemplary embodiment of the invention as disclosed in the drawings, a means for plugging the end of a tube T is shown to comprise a plug generally designated 10. The plug is arranged to be freely inserted within the end of tube T and expanded therein into sealing engagement with the inner wall of the tube. The expandable portion of the plug comprises a yieldable sleeve means 11 and the expansion thereof is effected by the coaction of a body 12 and a pressure member generally designated 13. In effecting the sleeve expansion, the pressure member is drawn toward the body member by means of a bolt 14. During the expansion operation, the body member is held in a desired position within the tube end by means of a retaining member 15 detachably associated therewith. Rotation of bolt 14 to effect the desired relative movements of body member 12 and pressure member 13 is effected by manipulation of a suitable operating member 16 which extends outwardly of the tube end.

More specifically, body member 12 comprises a cup shaped element including a tubular portion 12a terminating in an annular longitudinally inner end 12b. A transverse portion 12c at the outer end of body member 12 is provided with an axial bore 12d. Upstanding from transverse portion 12c is a peripheral, annular, internally threaded boss 12e. Intermediate axial bore 12d and tubular portion 12a, the transverse portion 12c is provided with an opening 12f.

Pressure member 13 comprises an elongated cylindrical member 13a and a disc member 13b. Cylindrical member 13a is provided with an axial recess 13c opening longitudinally inwardly and internally threaded at its inner end 13d. The outer end of 13a is provided with an axial, threaded bore 13e for co-action with bolt 14. To preclude relative rotational movement while allowing longitudinal movement between pressure member 13 and body member 12, a pin 18 is fixed to cylindrical member 13a to extend freely through opening 12f in the transverse portion 12c of the body member.

Disc member 13b is secured to inner end 13d of cylindrical member 13a by means of an exteriorly threaded annular boss 13f. The annular peripheral portion 13g of disc 13b is aligned longitudinally with inner end 12b of body member 12, and sleeve means 11 is arranged to extend longitudinally therebetween.

In the illustrated embodiment, sleeve means 11 comprises a pair of yieldable, annular, longitudinally related elements 11a and 11b. To permit removal and reuse of plug 10 when desired, the sleeve elements are preferably formed of a resiliently yieldable material such as rubber.

As discussed above, the means for expending sleeve 11 by forcibly urging pressure member 13 toward body member 12 comprises a bolt 14. Threaded shank 14a of bolt 14 is passed freely through bore 12d of body member 12 and into threaded engagement with bore 13e of pressure member 13. The head 14b of bolt 14 is disposed longitudinally outwardly of transverse portion 12c of body member 12 and a suitable washer 17 is provided therebetween on shank 14a to transmit longitudinal thrust to the body member while effectively minimizing friction therebetween. For cooperation with operating member 16, head 14b of bolt 14 is provided with a longitudinally outwardly opening recess 14c having a non-circular transverse cross section, the cross section in the illustrated embodiment being shown as square. To retain the plug 10 in assembled relationship, the inner end 14d of bolt 14 may be peened.

Retaining member 15 comprises a tubular element having an externally threaded inner end 15a adapted for engagement with internally threaded boss 12e of the body member. Adjacent the opposite end, retaining member 15 is provided with a radially outer collar 15b having an external diameter at least equal to the internal diameter of tube T, whereby the insertion of retaining member to within the end of the tube is limited by the abutment of collar 15b with the end of the tube. The spacing of collar 15b from inner end 15a is made to be proper for the desired positioning of plug 10 within the end of the tube. Thus an automatic positioning of the plug during the installation is effected.

The operating member 16 comprises an elongated rod having an inner end 16a provided with a transverse cross section complementary to the cross section of recess 14c of bolt head 14b. In the illustrated embodiment the entire longitudinal extent of rod 16 is of a similar square cross section. The outer end 16b of the rod may be bent at right angles to the remainder thereof so as to form a suitable operating handle.

To install plug 10 within tube T, retaining member 15 is secured to plug 10 by threadedly engaging inner end 15a of the retaining member with threaded boss 12e of the body member 12 of the plug. The retaining member is then inserted into tube T with plug 10 secured to the end thereof, until collar 15b abuts the end of tube T as seen in Fig. 1. Operating member 16 is then manipulated, causing disc 13b to move toward the body member and effect a longitudinal compression of sleeve 11 between annular portion 13g of the disc and inner end 12d of the body member. The longitudinal compression of sleeve 11 effects a radial expansion thereof until, as seen in Fig. 2, the sleeve is forced into tight sealing engagement with the inner wall of tube T and with the peripheral portion 13g of the disc. Thus, the tube T is sealingly plugged.

To remove the installing means, retaining member 15 is reversely threaded to disengage end 15a from boss 12e, and operating member 16 is longitudinally withdrawn from engagement with bolt recess 14c. The retaining and operating members may then be removed from tube T and plug 10 remains therewithin to effect a sealing closure of tube T, as seen in Fig. 3.

To remove plug 10 from tube T when desired, retaining member 15 is merely reinserted into the tube end and inner end 15a is threadedly secured to body member 12. Operating member 16 is then inserted through the retaining member to engage bolt head 14b and is manipulated to rotate bolt 14 and cause a movement of pressure member 13 away from body member 12. This removes the longitudinal compressive force and allows sleeve 11 to be restored to the uncompressed, unexpanded condition of Fig. 1. Retaining member, with plug 10 attached to the inner end thereof, is then longitudinally removed from tube T as desired.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Means installable fully within an end of a tube for sealingly plugging the tube, comprising: a cup shaped body member adapted to be received within a tube end and having a transverse outer end and a tubular portion extending longitudinally inwardly therefrom to terminate in an annular inner end; pressure means including a rigid tubular member longitudinally movable in said tubular portion of the body member and having a transverse outer end, and a radially enlarged disc member secured to the inner end of the rigid tubular member and having an annular periphery aligned longitudinally with the said inner end of the tubular portion; a thin yieldable sleeve supported concentrically on said rigid tubular member extending longitudinally between said disc periphery and the inner end of the body member; a bolt extending axially, freely through said outer end of the body member and threadedly engaging the rigid tubular member, the head of the bolt being outwardly of said outer end of the body member to effect forceful movement of the pressure means toward said outer end as an incident of rotation of the bolt, the length of the threaded portion of the bolt being proper to maintain a spacing between the same and said disc when the pressure means is at the extreme of its movement toward said outer end of the body member; and means preventing relative rotation of said body member and said pressure means, said sleeve when longitudinally uncompressed being freely receivable within the tube and being expanded radially outwardly as an incident of pressure being exerted longitudinally thereon by said disc member and said inner end of the body member.

2. Means for sealingly plugging a tube, comprising a plug receivable within the tube and including a body having an annular inner end, a pressure means extending longitudinally from said inner end and having a portion complementary to and spaced inwardly from said inner end, a bolt through said body and threadedly engaging the pressure means to force said portion outwardly toward said inner end as an incident to rotation of the bolt, said bolt having its inner end spaced at all times outwardly of the inner end of the pressure means, and a yieldable sleeve between said inner end and said portion of the pressure means arranged to be expanded radially as an incident of the movement of said portion toward said end thereby to seal the pressure means to the tube.

References Cited in the file of this patent

UNITED STATES PATENTS

| | | |
|---|---|---|
| 888,146 | Deasy | May 19, 1908 |
| 1,059,053 | Lennon | Apr. 15, 1913 |
| 1,850,040 | Turner | Mar. 15, 1932 |